Figure 1:
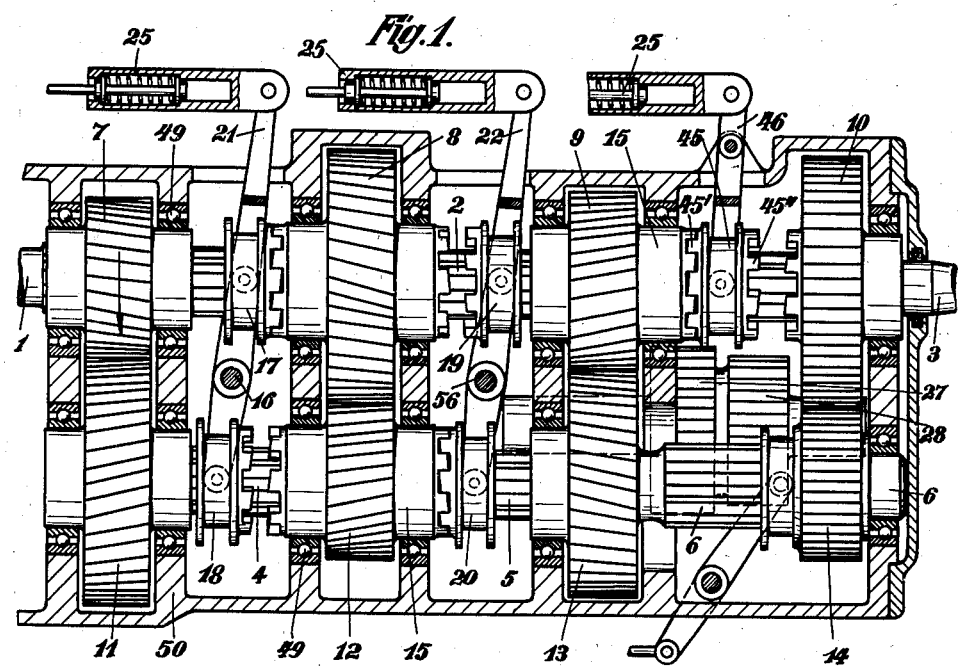

Feb. 11, 1936.   K. MAYBACH   2,030,752

CHANGE SPEED GEAR

Filed Nov. 1, 1934

Inventor: Karl Maybach
Attorney: Edmund H. Parry Jr.

Patented Feb. 11, 1936

2,030,752

UNITED STATES PATENT OFFICE 2,030,752

CHANGE SPEED GEAR

Karl Maybach, Friedrichshafen, Bodensee, Germany, assignor to Maybach-Motorenbau G. m. b. H., Friedrichshafen, Bodensee, Germany Application November 1, 1934, Serial No. 751,043
In Germany November 1, 1933

2 Claims. (Cl. 74—363)

My invention relates to change speed gears and has special reference to gears of this kind in which the gear wheels in the main shaft train are in constant mesh with the respective gear wheels in the counter shaft train.

A main object of my invention is a simplification in design and construction for the purpose of having a very compact change speed gear allowing for at least eight forward and 4 reverse speeds.

The invention will be understood best when having reference to the drawing which represents an example embodying my invention.

Figure 2:
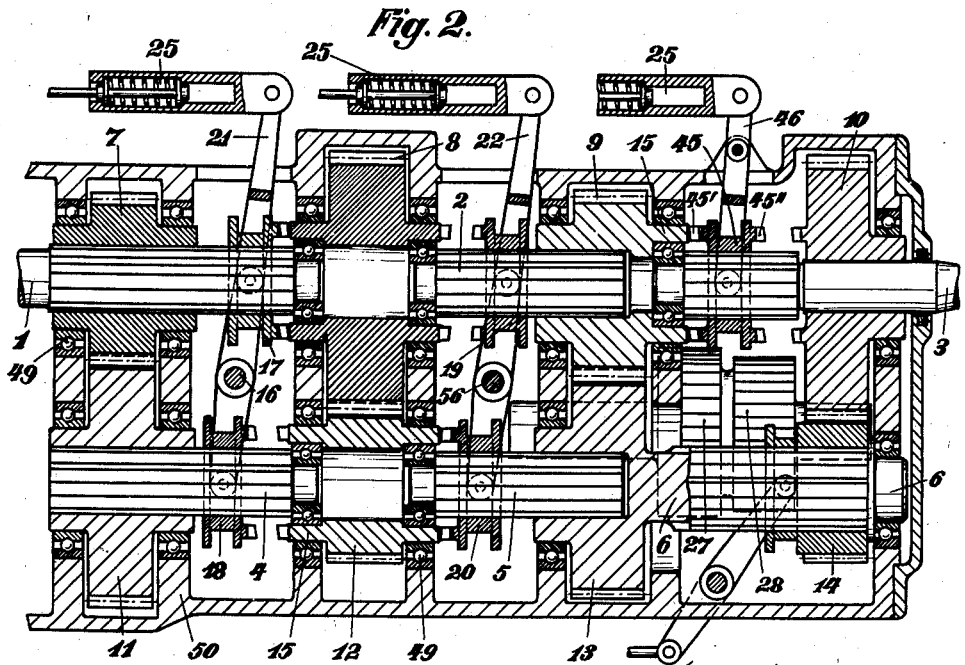

In Fig. 1 the gear case is shown in section allowing a side view on the shafts, gears and their operating devices. Fig. 2 is also a vertical longitudinal section but the gears are shown in section too.

There are two shaft trains, a main train and a counter train. The main train is made up of shaft portions 1, 2 and 3, whereas the counter train comprises the portions 4, 5 and 6. Four gears are provided in the main train: 7, 8, 9 and 10, and four gears in the counter train: 11, 12, 13 and 14. Gears 7, 9, 11, 13 and 14 are splined to their shaft portions: 1, 2, 4, 5 and 6, respectively. The second pair of gears (8, 12) are independently mounted between the first and second portions (1, 2 and 4, 5) of the main and counter trains. Five of the six gear wheels of 3 pairs (7, 11; 8, 12 and 9, 13) are provided with lateral collars 15 journaled by means of roller or ball bearings in the casing 50. The ends of main shaft portions 1 and 2 are journaled within gear 8, and the ends of counter shaft portions 4 and 5 are journaled within gear 12. Gear 10 is loosely journaled on shaft portion 3.

There are clutches 17 and 19 by means of which gear 8 may be coupled to main shaft portion 1 and portion 2, respectively. Clutches 18 and 20 are adapted to connect gear 12 to counter shafts portions 4 and 5, respectively. Lever 21 journaled at 16 connects clutches 17 and 18 so as to operate alternately. In the same manner lever 22 journaled at 56 causes alternate operation of clutches 19 and 20.

Between gears 9 and 10 a double-acting clutch 45 is splined to shaft portion 3, adapted alternately to connect shaft portion 3 with gear 9 or with gear 10. Gear 14 may be shifted on shaft portion 6 so as to come into engagement with gear 27 which is made integral with gear 28. Both these gears can be shifted to the right by means of any well known mechanism (not represented for the purpose of not complicating the drawing) so as to bring gear 28 in mesh with gear 10 when gear 27 is in engagement with gear 14.

The eight forward speeds are attained as follows:

(a) Driving shaft 1—gear 7—gear 11—counter shaft portion 4—clutch 18—gear 12—gear 8—clutch 19—main shaft portion 2—gear 9—gear 13—counter shaft portion 6—gear 14—gear 10—clutch 45''—driven shaft 3; (left hand position of lever 21, left hand position of lever 22, right hand position of double clutch 45);

(b) Driving shaft 1—gear 7—gear 11—counter shaft portion 4—clutch 18—gear 12—clutch 20—counter shaft portion 5—gear 13—counter shaft portion 6—gear 14—gear 10—clutch 45''—driven shaft 3; (lever 22 was shifted to its right hand position, as in the drawing);

(c) Driving shaft 1—gear 7—gear 11—counter shaft portion 4—clutch 18—gear 12—gear 8—clutch 19—main shaft portion 2—gear 9—clutch 45'—driven shaft 3; (lever 22 was shifted back to its left hand position and double clutch 45 was also shifted to its left hand position);

(d) Driving shaft 1—clutch 17—gear 8—clutch 19—main shaft portion 2—gear 9—gear 13—counter shaft portion 6—gear 14—gear 10—clutch 45''—driven shaft 3; (lever 21 was shifted to its right hand position and double clutch 45 was also shifted to its right hand position);

(e) Driving shaft 1—gear 7—gear 11—counter shaft portion 4—clutch 18—gear 12—clutch 20—counter shaft portion 5—gear 13—gear 9—clutch 45'—driven shaft 3; (lever 21 was shifted back to its left hand position, lever 22 to its right hand position, and double clutch 45 to its left hand position);

(f) Driving shaft 1—clutch 17—gear 8—gear 12—clutch 20—counter shaft portion 5—gear 13—counter shaft portion 6—gear 14—gear 10—clutch 45''—driven shaft 3; (lever 21 was shifted to the right again and double clutch 45 also to the right);

(g) Driving shaft 1—clutch 17—gear 8—clutch 19—main shaft portion 2—gear 9—clutch 45'—driven shaft 3 (direct drive); (lever 22 was shifted to the left and double clutch 45 to the left also);

(h) Driving shaft 1—clutch 17—gear 8—gear 12—clutch 20—counter shaft portion 5—gear 13—gear 9—clutch 45'—driven shaft 3 (overspeed drive); lever 22 was shifted back to the right).

In many cases six forward speeds will be sufficient so that positions (d) and (f) may be left out, which means that the additional gear pair 10, 14 is made use of only in the positions (a) and (b).

The four reversing speeds are attained as follows:

(i) Driving shaft 1—gear 7—gear 11—counter shaft portion 4—clutch 18—gear 12—gear 8—clutch 19—main shaft portion 2—gear 9—gear 13—counter shaft portion 6—gear 14—gear 27—gear 28—gear 10—clutch 45''—driven shaft 3;

(k) Driving shaft 1—gear 7—gear 11—counter shaft portion 4—clutch 18—gear 12—clutch 20—counter shaft portion 5—gear 13—counter shaft portion 6—gear 14—gear 27—gear 28—gear 10—clutch 45''—driven shaft 3;

(l) Driving shaft 1—clutch 17—gear 8—clutch 19—main shaft portion 2—gear 9—gear 13—counter shaft portion 6—gear 14—gear 27—gear 28—gear 10—clutch 45''—driven shaft 3;

(m) Driving shaft 1—clutch 17—gear 8—gear 12—clutch 20—counter shaft portion 5—gear 13—counter shaft portion 6—gear 14—gear 27—gear 28—gear 10—clutch 45''—driven shaft 3.

I prefer to make use of this new construction of change speed gears in connection with inclined front faces of the claws of the clutches. This inclination of the front faces has the advantage that for changing the speed it is not necessary to dis-engage the main clutch usually situated between the motor and the change speed gear. The inclination of the front faces has to be such that at first when the clutch teeth intended to come to engagement they do not engage but rattle past each other until the originally slower coupling half overruns the originally faster half, as explained in my basic U. S. Reissue Patent No. 17,707. In this case the simplification attained by my improvement is of special advantage.

In Fig. 1 of the drawing such inclination of the front faces of the clutch teeth is shown in all of the clutches, and consequently spring acting devices 25 of well known type are provided so that the coupling halves are resiliently pressed against each other while they rattle past each other before their final engagement. But of course the levers 21, 22 and 46 may also be operated without such spring devices.

I do not want to be limited to the details disclosed or shown in the drawing as many variations will occur to those skilled in the art.

What I claim is:

1. A change speed gear comprising: a main shaft train made up of more than two shaft portions; a counter shaft train made up also of more than two portions; three pairs of constantly meshing gears, one gear of each being situated in the main shaft train, and the gear meshing therewith being situated in the counter shaft train; the gears of the first and third pair being splined to the first and an intermediate portion of said main and of said counter shaft portions, respectively; the gears of the middle pair of said pairs of gears being interposed between and mounted independently of said first and said intermediate portions of said main shaft train and of said counter shaft train, respectively; a pair of single acting clutches splined to the first shaft portions of said main shaft train and said counter shaft train, respectively, and operative alternately to clutch the middle gear of the main train to the first main shaft portion or to clutch the middle gear of the counter shaft train to the first counter shaft portion; another pair of single acting clutches splined to the second shaft portions of said main and of said counter shaft train, respectively, and operative alternately to clutch the middle gear of the main train to the second main shaft portion or to clutch the middle gear of the counter shaft train to the second counter shaft portion; the individual clutches of each of said two pairs of clutches being adapted to be operated alternately.

2. A change speed gear as claimed in claim 1 further including a fourth pair of gears, one gear thereof loosely surrounding the last portion of said main shaft train, the other gear being splined to the last portion of said counter shaft train; the gears on the intermediate and last portions of the main shaft train being provided with clutch faces, and a double-acting clutch splined to the last portion of said main shaft train and being adapted alternately to cause connection between said last main shaft portion and the gear splined to said intermediate main shaft portion or between said last main shaft portion and said gear loosely surrounding said last main shaft portion.

KARL MAYBACH.